Aug. 3, 1954
C. F. BETHEA
2,685,560
MEANS AND METHOD FOR CONVERTING HYDROCARBONS
Filed Nov. 21, 1950
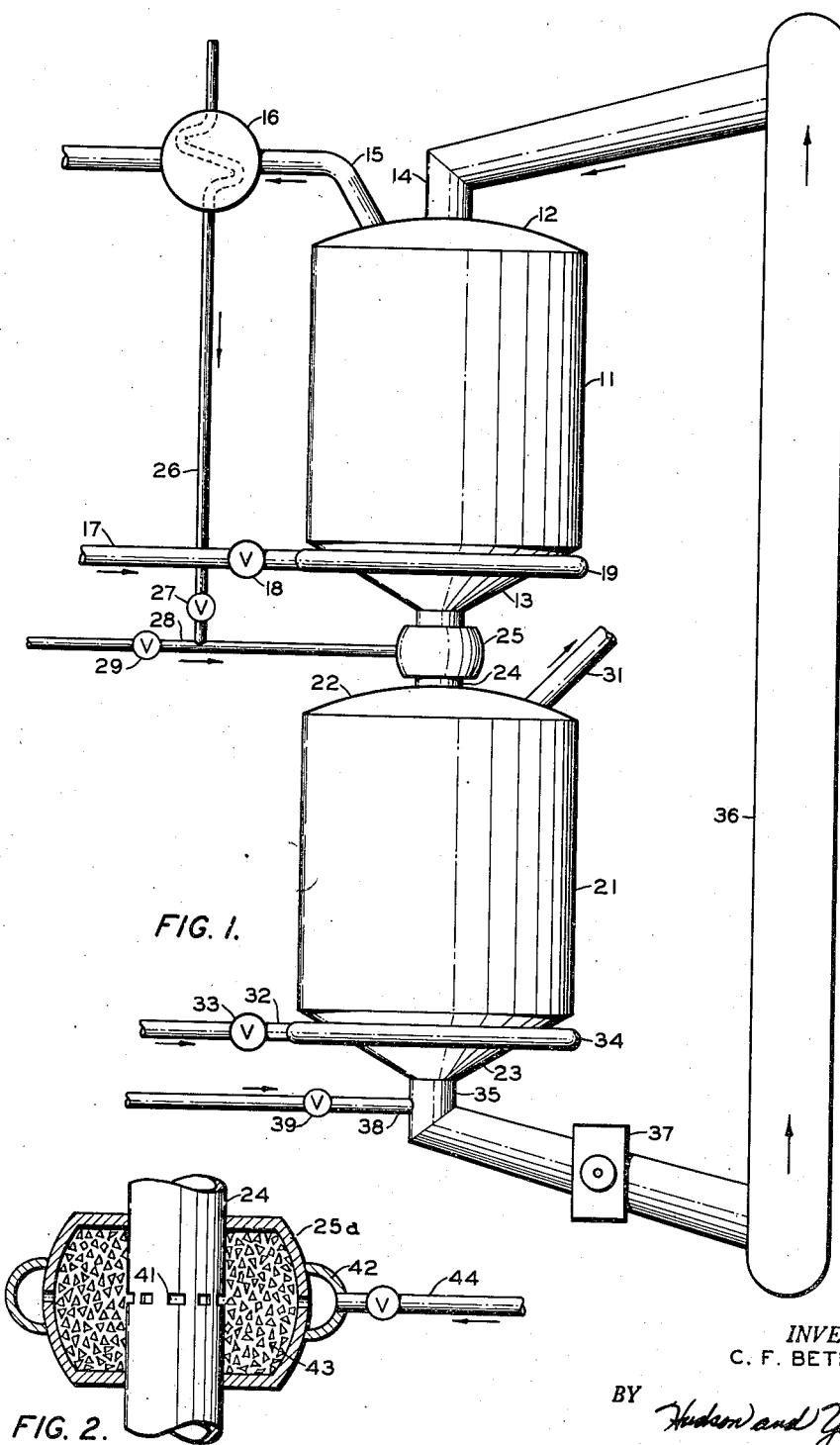
INVENTOR.
C. F. BETHEA
BY *Hudson and Young*
ATTORNEYS

Patented Aug. 3, 1954

2,685,560

UNITED STATES PATENT OFFICE 2,685,560

MEANS AND METHOD FOR CONVERTING HYDROCARBONS

Charles F. Bethea, Bartlesville, Okla., assignor to Phillips Petroleum Company, a corporation of Delaware Application November 21, 1950, Serial No. 196,753

1 Claim. (Cl. 196—55)

This invention relates to the conversion of hydrocarbons. In one of its more specific aspects, it relates to the conversion of hydrocarbons in pebble heater apparatus. In another of its more specific aspects it relates to improved pebble heater apparatus for the conversion of hydrocarbons. In another of its more specific aspects it relates to a means and method for evenly distributing reactant material throughout a pebble conversion chamber.

Thermal conversion processes which are carried out in so-called pebble heater apparatus utilize a gravitating mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed of solid heat exchange material which flows downwardly through the chamber in direct heat exchange with hot gaseous heat exchange material. The solid heat exchange material is heated to a high temperature in the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at the periphery of its lower end portion and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are substantially spherical in shape and range from about 1/8 inch to about 1 inch in diameter. In a high temperature process, pebbles having a diameter of between about 1/4 to 3/8 inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

When operating conventional pebble heater apparatus it has been common practice to utilize steam for the purpose of sealing the pebble conduit extending from the bottom of the upper chamber to the top of the lower chamber. This steam seal has prevented the flow of combustion gas from the heating chamber to the reaction chamber and has likewise prevented the flow of reaction products from the reaction chamber to the heating chamber of that apparatus. An excess of air is conventionally used in the heating chamber so as to control the temperature therein. Thus the combustion gas from that chamber contains a considerable amount of oxygen. In conventional operation of such apparatus, the steam has been introduced into the pebble throat at a relatively very low temperature as compared to the temperature of the pebbles within the pebble conduit. I have found that the use of this low temperature gas has resulted in a material increase in breakage of the pebbles. In order to obtain efficient operation of pebble heater apparatus, it is obviously necessary to reduce the breakage of pebbles to a minimum. I have devised a method whereby pebble breakage resulting from thermal shock in the connecting pebble conduit is substantially eliminated.

Another disadvantage in the use of steam as sealing gas between the pebble chambers is the fact the oxygen present in the steam acts as an oxidizing agent when contacting certain reaction products obtained in the operation of pebble heater apparatus. Steam tends to react with any carbon on the surface of the pebbles or in the upper portion of the reaction chamber to form water gas which contains considerable quantities of oxides of carbon. Such oxides are very difficult to separate from reaction products such as acetylene. For this reason in reactions such as the conversion of hydrocarbons to form acetylene it is very undesirable to use steam as the sealing medium in the pebble conduit between the pebble chambers.

An object of this invention is to provide improved pebble heater apparatus for converting hydrocarbons. Another object of the invention is to provide improved means for introducing sealing gas between pebble chambers of pebble heater apparatus. Another object of the invention is to provide an improved method for sealing the reaction chamber of pebble heater apparatus from the pebble heater chamber of such apparatus. Another object of the invention is to provide a method for preventing flow of gases from one pebble chamber to the other of pebble heater apparatus while preventing any substantial pebble breakage by reason of thermal shock. Other and further objects and advantages will be apparent to those skilled in the art upon study of the accompanying discussion and the drawings.

Broadly speaking, this invention comprises sealing the reaction chamber from the pebble heater chamber of pebble heater apparatus by introducing a preheated gaseous hydrocarbon or hydrogen into the connecting pebble conduit between the chambers or by burning a very small portion of that material in the presence of a quantity of oxygen or air which is in an amount less than the theoretic stoichiometric amount necessary for complete combustion thereof.

In reactions carried on within pebble heater apparatus where acetylene is not the resulting reaction product, the problem resulting from the presence of oxides of carbon such as carbon monoxide and carbon dioxide is not as great as when acetylene is produced therein. For that reason it is possible to burn a portion of the gaseous hydrocarbon material or hydrogen in the presence of a small amount of air so as to preheat the balance of the hydrocarbon or hydrogen, thus raising the temperature of the sealing material to substantially that of the pebbles gravitating from the heating chamber to the reaction chamber. By carefully controlling the amount of oxygen which is utilized for the combustion of a small portion of the hydrocarbon or hydrogen material, it is possible to reduce the amount of oxides of carbon in the reaction chamber substantially below that which is available when stream is used as the sealing material. This method also makes it possible to maintain the temperature of the sealing gas at substantially the temperature of the pebbles and thus prevents any substantial amount of thermal shock of the pebbles in the pebble conduit.

Better understanding of the invention will be obtained upon reference to the diagrammatic drawings in which Figure 1 is an elevational schematic representation of a preferred form of the pebble heater apparatus of this invention. Figure 2 is a sectional view of the pebble conduit between the pebble heater and reaction chambers of the pebble heater apparatus of this invention.

Referring particularly to Figure 1 of the drawings, pebble heater chamber 11 is an upright elongated chamber closed at its upper and lower ends by closure members 12 and 13, respectively. Pebble inlet conduit 14 extends into the upper portion of chamber 11, preferably as a central inlet thereto. Pebble inlet conduit 14 may, however, be divided so as to provide a plurality of pebble inlets distributed over the top of chamber 11. Gaseous effluent outlet conduit 15 is provided in the upper portion of chamber 11 and extends through heat exchanger 16. Heating material inlet conduit 17, having flow control valve 18 provided therein, extends preferably at least a portion of the way about the lower end of pebble heater chamber 11 as header member 19 and communicates with the interior of chamber 11 through the lower end closure thereof.

Reaction chamber 21 is an upright elongated chamber closed at its upper and lower ends by closure members 22 and 23, respectively. Pebble conduit 24 extends between closure member 13 of pebble heater chamber 11 and closure member 22 of reaction chamber 21. Conduit 24 may be a single conduit or a plurality of conduits uniformly distributed about the bottom and top of chamber 11 and chamber 21, respectively, so as to convey uniform quantities of pebbles therebetween. For the purpose of simplicity, this invention will be described in connection with the single conduit 24 but other conduits may be provided and sealed in the same manner as the single conduit shown. Sealing chamber 25 surrounds a portion of the length of pebble conduit 24 and communicates with the interior of conduit 24 through the conduit wall. Inlet conduit 26 extends through heat exchanger 16 to sealing chamber 25 and has flow control valve 27 provided therein. Conduit 26 is connected at its downstream end to sealing chamber 25. Inlet conduit 28, having flow control valve 29 provided therein, is connected to inlet conduit 26 downstream of flow control valve 27. Gaseous effluent conduit 31 is provided in the upper end portion of reaction chamber 21, preferably in closure member 22. Reactant material inlet conduit 32, having flow control valve 33 provided therein, preferably extends at least a portion of the way around the lower end of reaction chamber 21 as header member 34 and communicates with the interior of chamber 21 through its lower end portion. Pebble outlet conduit 35 extends from the lower end portion of reaction chamber 21 and is connected at its lower end to the lower end portion of elevator 36. Elevator 36 is connected at its upper end portion to pebble inlet conduit 14 extending into the upper end portion of pebble heater chamber 11. Pebble feeder 37 may be any conventional type pebble feeder, such as a star valve, a gate-type valve, a vibratory feeder, or a rotatable table feeder. Inlet conduit 38, having flow control valve 39 provided therein, is connected to pebble outlet conduit 35 intermediate the lower end portion of reaction chamber 21 and pebble feeder 37.

Sealing chamber 25 is in one modification of the invention similar to sealing chamber 25a shown in Figure 2 of the drawings. Pebble conduit 24 is provided with gaseous material inlet openings 41 for the introduction of sealing gas therethrough. Sealing chamber 25a is provided with header member 42 to provide for uniform distribution of gaseous material through that chamber. Such a header member, however, is not required for the proper operation of this apparatus. Refractory aggregate material 43 is, in the modification shown in Figure 2 of the drawings, provided in sealing chamber 25a and encloses a portion of pebble conduit 24, mainly that portion which is provided with gaseous material inlet conduits 41 therein. This refractory aggregate material is not present in the modification shown in Figure 1 of the drawings. Inlet conduit 44 is connected to header member 42 and provides inlet means for the sealing gas into sealing chamber 25a. Conduit 44 may be connected directly to sealing chamber 25a.

In the method of operating pebble heater apparatus such as that described above, pebbles are introduced into the upper portion of pebble heater chamber 11 and form a contiguous pebble mass therein, which mass of pebbles gravitates through that chamber and through pebble conduit 24 into reaction chamber 21 through which the refractory pebble mass is also gravitated as a contiguous pebble bed. Heating material is introduced into the lower portion of pebble heater chamber 11 and heats the refractory pebbles within chamber 11 to a high temperature therein. The gravitating pebbles within pebble heater chamber 11 are raised to a temperature generally within the range of between 1200° F. and 3400° F., depending upon the reaction products desired from the conversion within reaction chamber 21. Temperatures within the range of between 1000° F. and 1600° F. are normally utilized for the conversion of hydrocarbon oils to form normally liquid olefins and aromatic hydrocarbon fractions such as gasoline and the like. Temperatures within the range of between 1800° F. and 3200° F. are generally utilized for converting normally gaseous materials, such as ethane to ethylene, acetylene, or the like. The temperature to which the pebbles are heated within pebble heater chamber 11 is normally about 200° F. above the reaction temperature desired in reaction chamber 21.

The heating material which is introduced into the lower portion of pebble heater chamber 11 may be a hydrocarbon fuel, which hydrocarbon fuel is burned upon the surface of the pebbles and the resulting hot combustion gas is passed upwardly through the contiguous mass of pebbles in direct heat exchange therewith. Hot combustion gas resulting from the burning of feed outside of pebble heater chamber 11 or in the lower portion of chamber 11 but separated from the pebbles may also be used for the purpose of the direct heat exchange with the pebbles. Combustion gases which are cooled in the direct heat exchange with the pebbles in pebble heater chamber 11 are removed from the upper portion of that chamber through gaseous effluent conduit 15. These gaseous materials which are removed from the upper portion of pebble heater chamber 11 are ordinarily at a relatively high temperature, the exact temperature depending upon the temperature to which the pebbles are being heated. Ordinarily the temperature of the gaseous effluent from pebble heater chamber 11 ranges between 800° F. to 2000° F. These gaseous materials are passed through heat exchanger 16. In reactions in which it is desired to reduce the presence of oxides of carbon to an absolute minimum, combustion products do not form a desirable portion of the sealing gas for use in sealing the pebble heater chamber from the reaction chamber. I have found that a gaseous material, such as a normally gaseous hydrocarbon or hydrogen, is raised to a relatively high temperature by indirect heat exchange with the gaseous effluent from pebble heater chamber 11. Ordinarily indirect heat exchange between gases is not very efficient. In the process of this invention, however, the quantity of gaseous material which is required to seal throat member 24 to prevent gaseous materials from passing from one pebble chamber to the other is relatively small in comparison to the amount of gaseous effluent from pebble heater chamber 11. For this reason I maintain the rate of flow of the sealing gas through conduit 26 in heat exchanger 16 substantially lower than the rate of flow of gaseous effluent flow through conduit 15 and heat exchanger 16. The temperature of the sealing gas is raised to a temperature within the range of between 700° F. and 1900° F., once again depending upon the temperature of the gaseous effluent from pebble heater chamber 11, and the relative rates of flow of sealing gas and gaseous effluent from chamber 11. Other indirect heat may be applied thereto if desired. The heated sealing gas is introduced into sealing chamber 25 and flows through gaseous inlets 41 and into chamber 24. The presence of this gas within chamber 24 is sufficient to fill the void spaces between the pebbles within that pebble conduit and preclude the flow of gaseous materials between the pebble chambers. These gaseous materials are easily separated from the products of reaction within chamber 21. The use of hydrogen as a sealing gas is at times undesirable for the reason that it is reactable with products of reaction within chamber 21. Thus, it is necessary to select specific reactions when using hydrogen as the sealing gas.

Pebbles which have been heated to a high temperature within chamber 11 gravitate through chamber 21 as a contiguous pebble bed. Reactant materials in the gaseous or vaporous form are introduced into the lower portion of chamber 21 through reactant material inlet conduit 32 and flow upwardly through and in direct heat exchange with the heated pebbles in the reaction chamber. Resulting reaction products are removed from the upper portion of reaction chamber 21 as gaseous effluent through effluent conduit 31. A second portion of sealing gas is in most cases introduced into pebble outlet conduit 35 so as to seal that conduit to prevent feed hydrocarbon or reaction products from escaping through the pebble outlet conduit and elevator 36 into the upper portion of pebble heater chamber 11. Pebbles which are withdrawn from the bottom of reaction chamber 21 are at a relatively low temperature, depending upon the particular reaction being carried on within chamber 21. The volume of sealing gas which is introduced into pebble outlet conduit 35 from inlet conduit 38 may be controlled so as to substantially control the temperature of pebbles from the lower portion of reaction chamber 21 so as to lower their temperature and facilitate handling. Such control of pebble temperature is particularly necessary where a mechanical elevator, such as a bucket elevator or a helical screw-type elevator is utilized to raise the pebbles to the upper portion of pebble chamber 11. In some cases, the temperature of the pebbles will be so high as to make it desirable to utilize a gas lift-type elevator. In such a situation the sealing fluid may be utilized in a volume sufficient to substantially seal reaction chamber 21 and at the same time elevate the pebbles to the upper portion of heating chamber 11.

When carrying on reactions within reaction chamber 21 so as to obtain reaction products other than acetylene, it is possible to allow the presence of very small quantities of carbon oxides in the reaction products. In such a situation the gaseous material, such as normally gaseous hydrocarbons or hydrogen, are introduced into sealing chamber 25 or 25a through conduit 28 or 44. That sealing gas is introduced with an amount of air or oxygen which is not greater than that theoretical stoichiometric amount required for complete combustion. Ordinarily between 10 per cent and 50 per cent of the stoichiometric amount of air or oxygen will be sufficient to allow combustion of enough of the gaseous material to raise the temperature of the gas sealing medium to a point not much below that of the pebbles being gravitated through pebble conduit 24.

In the device shown in Figure 2 of the drawings, sealing chamber 25a is filled with refractory aggregate material, which material becomes quite hot as a static bed and the gaseous material which is introduced into sealing chamber 25a is heated to a high temperature by the combustion of a portion thereof and by passing in direct heat exchange with the refractory aggregate material contained in that sealing chamber as the gas flows into pebble conduit 24. In the modification shown as Figure 1 of the drawings, the gaseous material is introduced directly into sealing chamber 25 and is preheated by indirect heat exchange with pebbles through the wall of conduit 24. The gaseous materials preheated in this manner are introduced into the interior of pebble conduit 24 through gaseous inlets in that conduit. A portion of the gas may then be burned on the surface of the pebbles, the exact amount of combustion depending upon the amount of air or oxygen supplied with the sealing gas. In another modification of operation where sealing chamber 25 contains no aggregate material therein, chamber 25 is of such size that only partial combustion of the sealing gas is possible therein. Further combustion is carried out on the surface of pebbles gravitating through conduit 24. Thermal shock of pebbles gravitating through conduit 24 is substantially prevented by controlling the flow of gaseous material through conduit 28 so as to allow considerable preheating time for that gaseous material within sealing chamber 25 before it is introduced into the interior of pebble conduit 24. It is thus possible to entirely eliminate the oxygen from the sealing gas so as to preclude the presence of oxides of carbon in the sealing material.

It is of the utmost importance that the pebbles not be subjected to the shock of direct heat exchange with relatively cool sealing gases. As has been pointed out above, the use of relatively cool steam in conventional operation of pebble heater apparatus has resulted in an undue amount of pebble breakage. The present invention obviates the thermal shock from the sealing step in this pebble heater operation. It is also apparent that by utilization of this invention considerably less oxygen is available in the reaction chamber than is present when steam is used as the sealing material.

Many other modifications of this invention will be apparent to those skilled in the art upon study of the accompanying discussion and the drawings. It is believed that such modifications are clearly within the spirit and the scope of the instant application.

I claim:

The method of operating pebble heater apparatus which comprises in combination the steps of gravitating a mass of pebbles through a pebble heating zone; passing hot gaseous materials upwardly through and in direct heat exchange with said gravitating mass of pebbles in said pebble heating zone so as to raise the temperature of said pebbles within said pebble heating zone to a temperature within the range of between 1200° F. and 3400° F.; removing gaseous effluent from the upper portion of said pebble heating zone at a temperature within the range of between 800° F. and 2000° F.; gravitating said heated pebble mass from the bottom of said pebble heating zone into the upper portion of a reaction zone and downwardly therethrough; introducing reactant material into the lower portion of said reaction zone; passing said reactant materials and resulting reaction products upwardly through said gravitating mass of pebbles in said reaction zone; removing gaseous effluent from the upper portion of said reaction zone; passing a normally gaseous hydrocarbon material in indirect heat exchange with said effluent from said pebble heating zone so as to raise the temperature of said normally gaseous hydrocarbon material to a temperature within the range of between 700° F. and 1900° F.; preventing thermal shock to said pebbles by introducing sufficient said heated normally gaseous hydrocarbon material into the contiguous gravitating mass of pebbles between said pebble heating zone and said reaction zone so as to substantially fill the void spaces between the pebbles thereof; introducing between 10 per cent and 50 per cent of the stoichiometric amount of air based upon said heated normally gaseous hydrocarbon into said pebble mass between said pebble heating zone and said reaction zone, burning said normally gaseous hydrocarbon and said air while in contact with said gravitating mass of pebbles; gravitating said pebbles from the bottom of said reaction zone; and elevating said pebbles to the upper portion of said pebble heating zone.

References Cited in the file of this patent

UNITED STATES PATENTS

| Number | Name | Date |
| --- | --- | --- |
| 1,832,000 | Cross | Oct. 11, 1932 |
| 2,348,156 | Sheppard | May 2, 1944 |
| 2,366,372 | Voorhees | Jan. 2, 1945 |
| 2,374,151 | Wolk et al. | Apr. 17, 1945 |
| 2,378,394 | Degnan et al. | June 19, 1945 |
| 2,423,813 | Lechthaler et al. | July 8, 1947 |
| 2,432,962 | Bergstrom | Dec. 16, 1947 |
| 2,509,854 | Bailey et al. | May 30, 1950 |
| 2,518,842 | Weber | Aug. 15, 1950 |
| 2,530,274 | Weber | Nov. 14, 1950 |
| 2,532,613 | Dutcher | Dec. 5, 1950 |